United States Patent [19]

Singer et al.

[11] Patent Number: 5,325,263
[45] Date of Patent: Jun. 28, 1994

[54] RACK AND PINION RETAINING AND RELEASE DEVICE FOR REMOVABLE COMPUTER COMPONENTS

[75] Inventors: Richard Singer, Menlo Park; Charles Fiorella; Bryan Bolich, both of Sunnyvale; David Willheim, Los Gatos; Stephen Hobson, deceased, late of Palo Alto, by Judith Haccou, administratrix; Albert Napier, Campbell, all of Calif.

[73] Assignee: Silicon Graphics, Inc., Mountain View, Calif.

[21] Appl. No.: 734,142

[22] Filed: Jul. 22, 1991

[51] Int. Cl.⁵ .................... H05K 7/10; H01R 13/62; F16H 21/44; G06F 1/16
[52] U.S. Cl. .................... 361/683; 361/685; 361/727; 361/754; 361/798; 361/726; 439/157; 439/248; 74/109
[58] Field of Search ............... 312/223.1, 223.2, 332.1, 312/333; 439/153, 157, 159, 160, 247, 248, 377; 364/708, 708.1; 74/109; 361/683-685, 607-609, 724-727, 731, 732, 740, 741, 754, 759, 796-798, 801; 29/830, 832; 360/97.01, 98.01, 137

[56] References Cited

U.S. PATENT DOCUMENTS

| | | | |
|---|---|---|---|
| 4,152,138 | 5/1979 | Inouye et al. | 439/155 |
| 4,909,748 | 3/1990 | Kozono et al. | 439/247 |
| 4,939,622 | 7/1990 | Weiss et al. | 361/727 |
| 4,960,384 | 10/1990 | Singer et al. | 439/155 |
| 5,010,426 | 4/1991 | Krenz | 360/97.01 |

FOREIGN PATENT DOCUMENTS 2594997  8/1987  France .................... G11B 23/00

Primary Examiner—Leo P. Picard
Assistant Examiner—Michael W. Phillips
Attorney, Agent, or Firm—Blakely, Sokoloff, Taylor, Zafman

[57] ABSTRACT

A device for installing and removing a removable computer component, such as a data storage drive or computer card, into or out of a computer housing. The device features a drive sled to which the data storage drive is mounted. A stationary carrier tray is secured to the computer housing. Interlocking angled tracks on the drive sled and the carrier tray secure the two structures together. To promote easy coupling of the drive's electrical interface connectors, the front end of the drive sled has a floating guide plate with forward-projecting locating pins, which pins are used to align the electrical connectors held by the floating guide plate. A rack and pinion mechanism is provided. The rack is disposed on the top of the carrier tray while the pinion is located on the underside of the drive sled. As the drive sled slides onto the carrier tray, the lever-actuated pinion gear engages the rack and consequently displaces the drive sled relative to the stationary carrier tray. A torsion spring may be used to bias the pinion. The carrier tray also features a raised wedge that latches the lever at one extreme position when the drive sled is in its forward-most position to lock the data storage drive inside the computer housing.

31 Claims, 4 Drawing Sheets

RACK AND PINION RETAINING AND RELEASE DEVICE FOR REMOVABLE COMPUTER COMPONENTS

BACKGROUND OF THE INVENTION

1. Field of the Invention

The present invention relates to an apparatus that facilitates the fast and easy installation or removal of a removable computer component into or out of a computer. More precisely, the present invention provides a mounting bracket having a rack and pinion mechanism working in conjunction with interlocking angled tracks for engagement and disengagement of connectors between the removable component and the computer, wherein a floating guide plate with locating pins are used to assist alignment. The removable computer component includes hard disk drives, floppy disk drives, cards and the like.

2. Description of the Prior Art and Related Information

Mass storage devices including so called Hard Disk Drives (HDD) are commonplace components of modern personal computers. As these devices have a far higher storage capacity than the standard Floppy Disk Drive (FDD), transferring a substantial fraction of the data capacity of a HDD from one computer to another via floppy disks is impractical. This poses problems for computer users who may need access to the data on a HDD at differing locations. Indeed, those problems translate to FDDs and even to tape drives that sometimes have to be removed from the computer.

One solution is to make the disk drive removable, whereby it can be exchanged between computers. Advantages of an easily removable disk drive include easy exchange of data bases on a given computer, improved data security as the drive can be removed and stored in a physically secure location, and also easy removal to facilitate repair and service. Also, there is no need to disconnect any of the cables prior to removal if appropriate electrical disconnects are incorporated into the design.

Additionally, such removable disk drive systems are a means for efficiently utilizing expensive disk drives. To illustrate, a user may have several computers each lacking an expensive, specialized disk drive. But with a single removable disk drive, all of the computers can be served by such a removable drive as needed.

A number of systems that facilitate removal of disk drives are known in the art. U.S. Pat. Nos. 4,633,350 and 4,912,580 to Hanson and U.S. Pat. No. 4,979,909 to Andrews disclose two such systems. In Hanson, the drive is held in a carrier module which is manually inserted into a receiving unit mounted in the computer. The force of insertion engages connectors which link the drive to the computer. Removal is accomplished by simply pulling the drive out by a handle. Similarly, Andrews features fully manual insertion and extraction, but adds a barb-like engagement member attached to a side member which is mounted on the drive. The barb engages a support frame, which is mounted in the computer, to hold the drive in place. The barb can be released by turning a lever which in turn presses the barb back away from the frame.

U.S. Pat. No. 4,982,303 to Krenz provides a different mechanism for locking the drive in place. Krenz features a latch mounted across the face plate of the drive. A handle turns a gear which mates with an internal sector gear which is part of a lever member that also features a tongue. When the handle is pushed toward the drive face, the tongue moves in the opposite direction. The tongue is positioned to engage a side of a channel member, whereby contact between the tongue and the front side of the channel cause the drive to lock in place when the handle is depressed. Similarly, when the handle is pulled, the tongue engages the rear side of the channel to help break the connection between drive and computer.

U.S. Pat. No. 4,960,384 to Singer et al. discloses a convenient installation to and removal from a computer. The disk drive mounting bracket comprises three adjacent walls that fit inside the computer housing. Side brackets are attached to the either side of the box-shaped disk drive unit. When the disk drive is inserted into the mounting bracket, the side brackets act as guides to slide over inward-extending rails provided in the interior of the mounting bracket. A locking member with a hook means located on the exterior of the mounting bracket pivot inward and projects through a small window to secure the disk drive inside.

In view of the prior art, a need still exists for a more effective way of mounting a removable computer component to a computer. A useful application for such a device, of course, would be for removable disk drives.

SUMMARY OF THE INVENTION

The present invention relates to a device for easy insertion or extraction of a removable computer component into and out of a computer. In particular, depending upon which application, the removable computer component can be a data storage drive such as a hard disk drive, a floppy disk drive, a mass storage tape drive, an optical disk storage device, or any similar storage device known in the art; or it can be any other insertable and removable computer device such as a computer card.

In a preferred embodiment, smooth engagement and disengagement of the electrical connectors linking the data storage drive to the computer are achieved by a rack and pinion mechanism. The rack is formed into a carrier tray which itself is immovably mounted inside a data drive cavity in a computer housing. A drive sled adapted for mounting to the bottom of the data storage drive housing has a complementary pinion gear designed to mesh with the rack. The rack and pinion are geared to forcefully and efficiently engage the pins on a connector with its mating receiving member. A lever extends radially from the center of the pinion and is used to actuate the pinion. A torsion spring anchored into the pinion and the drive sled biases the pinion in one direction, preferably to hold the pinion in a ready position to receive the rack.

The drive sled has angled tracks formed into its underside that interlock with another set of angled tracks formed into the top of the carrier tray. These interlocking angled tracks facilitate aligning the data storage drive when it is inserted into the computer, and to secure the drive sled to the carrier tray.

Once the drive sled is partially slid on to the carrier tray, the pinion gears catch the rack gears. Then by manually pushing the lever against the bias of the spring to one side, the teeth on the pinion rotate along the teeth on the immovable rack. As that happens, the drive sled and its associated data storage drive are pulled onto the stationary carrier tray, inward into the computer.

Another feature of the drive sled is a floating guide plate to which the electrical connectors (e.g., the SCSI interconnect plug) of the data storage drive are secured. To create the floating action, the sides of the guide plate are loosely held inside channels that limit motion of the guide plate vertically and laterally. The guide plate also has locating pins that help align the connectors during installation of the disk drive.

Taken collectively, all of the alignment parts function as follows. Sliding the lever in alternatively one direction or another displaces the drive sled and the data storage drive mounted thereon relative to the stationary carrier tray. So by carefully manipulating the lever, and with help from the locating pins and the floating guide plate, it is possible to jog the electrical connectors into alignment with their respective mating parts in the computer housing.

The present invention also provides a means for locking the data storage drive once installed in the computer housing. For that purpose, a raised wedge disposed on the top surface of the carrier tray forms an obstacle to block the lever from moving in the direction of bias as urged by the torsion spring, thereby retaining the drive in an installed condition.

Removal of the data storage drive simply entails reversing the process. The lever is slid over the raised wedge to permit freedom of motion and then pushed to the opposite side. The lever motion translates to rotation of the pinion in a direction opposite to before and, in turn, the drive sled backs out of the computer.

The present invention offers a number of advantages over the prior art. The connection of multiconductor connectors, as must be used to connect a hard disk drive to a computer for example, requires a significant insertion force. This may lead to large external forces being applied to the drive (and thus the computer) to achieve connection. The requisite force may be difficult for a user to determine. If insufficient force is applied, a faulty connection occurs. If excessive force is applied, the system may be damaged. The mechanical advantage offered by the present invention rack and pinion mechanism greatly reduces the required external force. Moreover, by using the lever, input force can be applied in controlled gradations with less chance of accidental damage to any coupling hardware.

Furthermore, the present invention can be configured so that the end of the range of travel of the lever-operated pinion gear corresponds to the full engagement of the connectors. Thus, correct insertion is easy to achieve and the risk of damage from excessive insertion forces is eliminated.

Likewise, the present invention solves similar problems involving the extraction of the drive from the computer. The significant forces required to overcome friction in the connector can lead to damaged parts. Advantageously, the mechanical advantage in the present invention allows the drive to be smoothly extracted from the computer housing.

Use of the rack and pinion mechanism provides great flexibility in the choice of how the insertion/extraction forces are applied. According to the present invention, the rack and pinion mechanism is arranged so that upon insertion, the two structures begin to mate just prior to the contact of the connectors, whereupon the rack and pinion can smoothly draw the connectors together. Furthermore, the degree of mechanical advantage offered is easily varied through the choice of pinion diameter and lever length.

By comparison, the prior art Krenz device offers little flexibility in these areas. Any such forces in Krenz come from the interaction of the tongue with the channel. Trying to vary the width of the channel and the size of the gears used are especially impractical as the depth consumed by the mechanism is depth lost for the drive. Also, the present invention does not require that the hard disk drive be recessed into the computer, thus saving more depth space. Nor is the front panel of the hard disk drive obscured in the present invention as it is in Krenz.

Advantageously, the present invention eliminates the need for a separate mechanism to hold the drive in place, as shown in Andrews. The mechanical resistance of the pinion against the rack can accomplish that function.

Accordingly, it is an object of the present invention to provide a device that facilitates easy installation and extraction of a removable computer component such as a data storage drive into and out of a computer housing. It is another object of the present invention to exploit the mechanical advantage inherent in a lever-actuated rack and pinion mechanism to ensure positive engagement and to defeat friction during disengagement of the electrical interface connectors. It is yet another object of the present invention to provide a floating guide plate with locating pins to help in aligning the electrical connectors during installation.

DETAILED DESCRIPTION OF THE INVENTION

In the following description, numerous details such as specific materials and configurations are set forth in order to provide a more complete understanding of the present invention. But it is understood by those skilled in the art that the present invention can be practiced without those specific details. In other instances, well-known elements are not described explicitly so as not to obscure the present invention.

The present invention relates to a device for conveniently installing or removing a removable computer device, such as a data storage drive, into or out of a computer. For convenience and clarity the present invention is described herein as being associated with a data storage drive. It should be appreciated, however, that the present invention can be used with other removable devices as well without departing from the spirit and scope of the invention. Depending on the specific computer application, the data storage drive can be a hard disk drive, a floppy disk drive, a mass storage tape drive, an optical disk storage drive, or any other disk drives known in the art.

Figure 1:
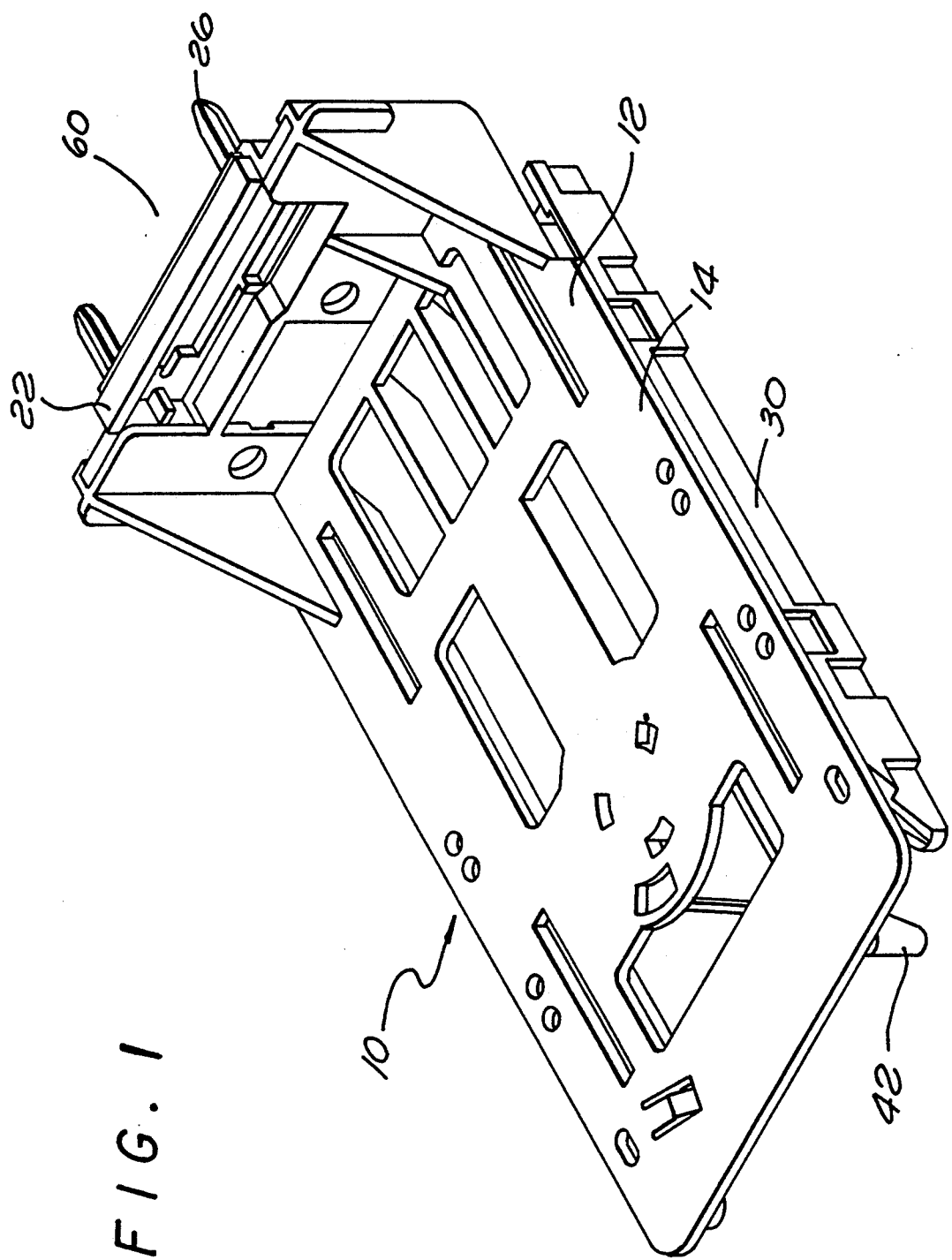
FIG. 1 is a perspective view of a preferred embodiment of the present invention, illustrated in its assembled state.

FIG. 1 provides a perspective view of a preferred embodiment of the present invention in its fully assembled form. Generally speaking, FIG. 1 illustrates a storage drive mounting assembly 10 that is designed to carry a data storage drive (not shown) into and out of a computer housing (not shown). The data storage drive is mounted piggyback to a drive sled subassembly 12, which slides relative to a stationary carrier tray 30. A lever 42 actuates a rack and pinion mechanism to generate the sliding motion of the drive sled subassembly 12. A salient feature in this drawing are the locating pins 26 disposed at the front end 60 of the drive sled subassembly 12. The locating pins 26 assist in aligning the electrical connectors (not shown) of the data storage drive with the interface ports of the computer to which the drive is to be mounted.

Figure 2:
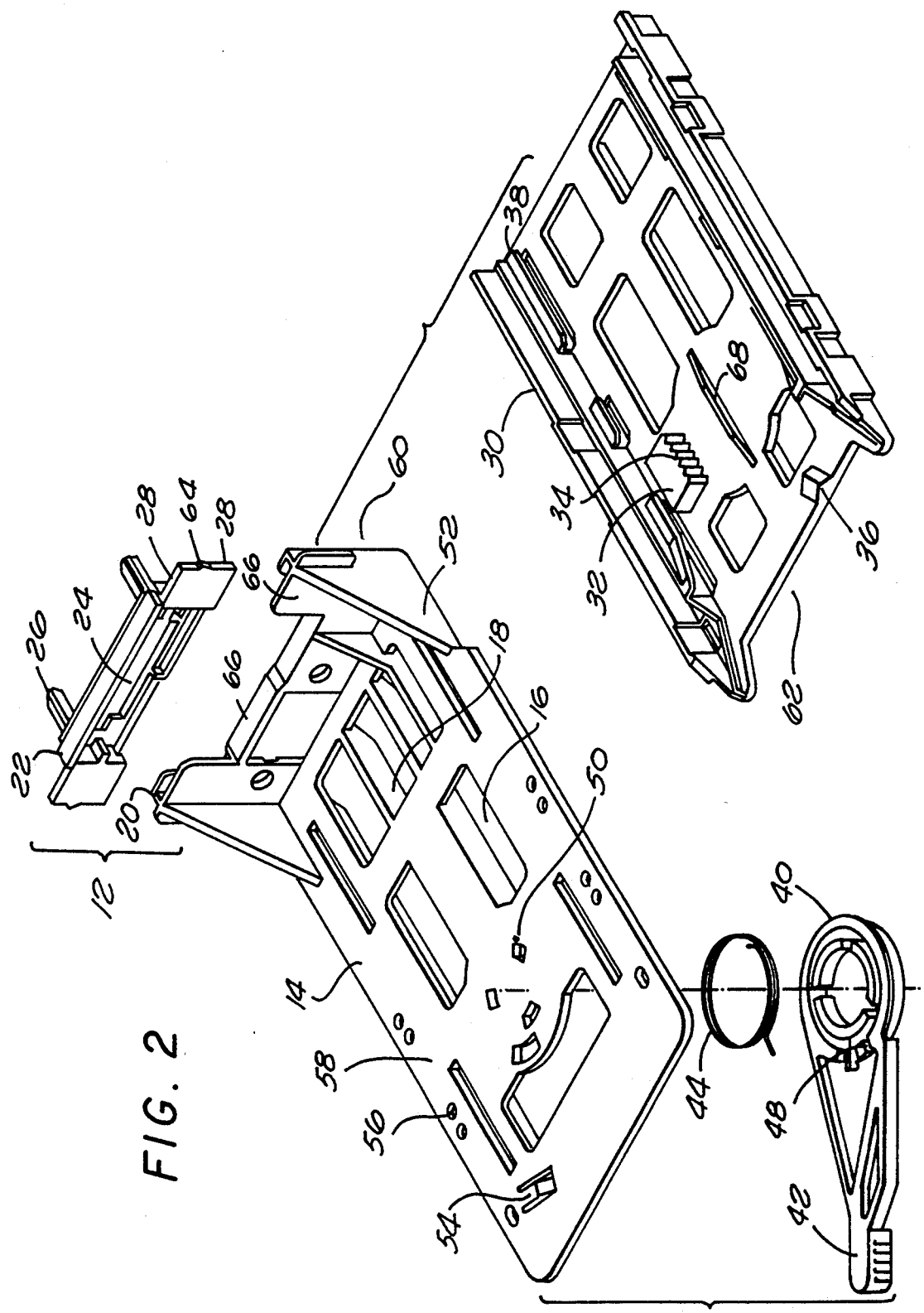
FIG. 2 is an exploded perspective view of the present invention depicting separately a floating guide plate, a drive sled, a torsion spring, a lever, a pinion gear, and a carrier tray.

FIG. 2 provides an exploded view of the storage drive mounting assembly 10 shown in FIG. 1. As mentioned above, the data storage drive is carried piggyback on a drive sled subassembly 12. The subassembly 12 is assembled from two parts; namely, a drive sled 14 and a floating guide plate 22. Assuming the data storage drive has a housing that is relatively rectangular with a flat bottom, the drive sled 14 easily mounts to the underside of the data storage drive. Assembly holes 56 formed into the base 58 of the drive sled 14 facilitate assembly to the data storage drive by use of screws or other fasteners known in the art. In the preferred embodiment, the drive sled 14 has a rectangular-shaped base 58 as shown, but clearly other shapes are possible depending on the configuration of the data storage drive.

There are several features of the drive sled 14 that improve its performance. First, its base 58 has a variety of cut-outs or openings 16 that reduce material cost and weight of the drive sled 14. Second, the base 58 features stiffeners 18 that run axially along the underside to maximize its rigidity and to minimize torsional flexing that might cause misalignment during installation of the data storage drive. Third, the drive sled 14 features a leading edge wall 66 reinforced on both ends by a triangular-shaped brace 52. When the data storage drive is mounted to the drive sled 14, the wall 66 ensures proper orientation and seating of the data storage drive. Finally, during installation or removal of the data storage drive from the computer housing, the electrical connections may experience frictional resistance which places large stresses on the leading edge wall 66 and the base 58, which may ultimately lead to failure. Hence, the benefit of having braces 52 is apparent.

Toward the front end 60, the front side of the leading edge wall 66 has integrated channels 20 oriented with their slots extending vertically. These channels 20 facilitate assembly of a floating guide plate 22 to the drive sled 14. As shown in FIG. 2, the floating guide plate 22 has a generally rectangular shape with an aperture 24 near the center and two locating pins 26 jutting outward in the direction of the front end 60. In the preferred embodiment, the aperture 24 in the floating guide plate 22 is adapted to carry a Small Computer System Interface (SCSI) plug.

A primary purpose of the floating guide plate 22 is to help align the electrical connectors of the data storage drive with their corresponding ports in the computer housing. So to provide a floating action, the guide plate 22 cannot be directly secured to the channels 20 by a common fastener. Instead, on either side of the floating guide plate 22 are ears 28 fashioned to loosely drop into the channels 20 of the drive sled 14. Each ear 28 has a thickness that does not occupy the entire slot of the channel 20 so that a certain amount of "play" between the floating guide plate 22 and the drive sled 14 is possible. In particular, the floating guide plate 22 can move a predetermined distance vertically, laterally or any combination of the two within the channels 20. To prevent accidental disassembly of the guide plate 22 from the channels 20, each ear 28 has a single saw tooth 64 that snaps into respective windows (not shown) in the channels 20. Since there is a clearance between the window borders and the saw tooth 64, the limited vertical motion of the floating guide plate 22 is not impaired.

To further assist in alignment, the floating guide plate 22 has twin locating pins 26 projecting from the front end 60 of the assembly 10, as shown in FIGS. 1 and 2. These locating pins 26 have a tapered tip intended to easily slide into a locating member or hole (not shown) disposed near the computer port. Even if there is slight misalignment between the locating pins 26 and the locating hole, the guide plate 22 can slightly shift or jog into proper alignment by virtue of its floating action. Needless to say, once the locating pins 26 are properly aligned, the electrical connectors secured to the aperture 24 are also properly aligned for precise engagement with their corresponding port.

As best shown in FIG. 1, the preferred embodiment locating pins 26 have a criss-cross cross-sectional area. This design places a lot of material out by the periphery of the pin 26 thereby minimizing the chance of buckling or outright failures resulting from the locating pin 26 approaching the locating hole at a skewed angle.

The present invention also provides a means of advancing the drive sled 14 into the computer housing. To that end, the present invention in a preferred embodiment utilizes a rack and pinion mechanism to generate linear displacement of the drive sled 14. As shown in FIG. 2, the pinion component 40 of the rack and pinion mechanism has a radially extending lever 42. The pinion 40 with its lever 42 are adapted for attachment to the underside of the drive sled base 58. Moreover, the pinion gear 40 and its lever 42 are biased in one direction by a torsion spring 44. The torsion spring 44 is anchored at one end to a spring slot 48 cut into the back side of the pinion gear 40, and plugged into an anchoring hole 50 disposed in the base 58 at the other end.

As mentioned before, the drive sled 14 is intended to mate with a carrier tray 30, shown in FIG. 2. The carrier tray 30 resembles a channel, and is immovably mounted to the computer housing. A strengthening rib 68 extends along the length of the carrier tray 30 to minimize axial bending and to support the drive sled 14 after assembly. Also disposed on the carrier tray 30 is the rack component 32 of the rack and pinion mechanism. The rack 32 has a row of teeth 34 used to engage the teeth on the pinion 40. Both the rack 32 and pinion 40 and their teeth 34 and 46 are of a conventional design known in the art, so no further details are necessary here.

Figure 6:
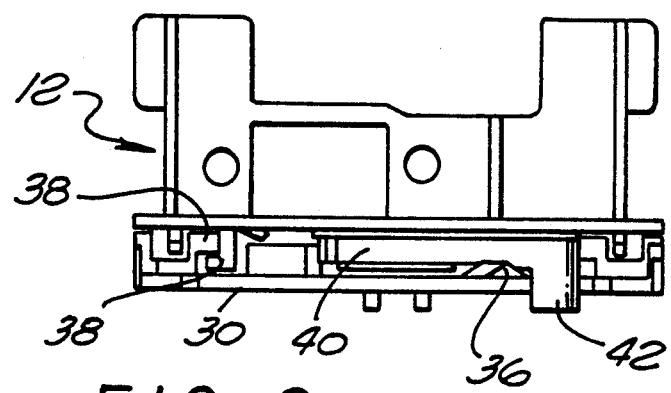
FIG. 6 is a view of the back end of the present invention.

Angled tracks 38 are provided on the top side of the carrier tray 30 and along the underside of the drive sled base 58. In fact, the angled tracks 38 of each complements the other so that the two structures can be slid into engagement along these tracks 38. Hence, during assembly, the front end 60 of the drive sled 14 is slid over the back end 62 of the carrier tray 30 in such a manner that the angled tracks 38 of both structures interlock as shown in FIGS. 2, 4 and 6. Simultaneous with this motion, the teeth 46 on the pinion gear 40 initially engage the teeth 34 on the rack 32. This stage of assembly is shown in FIG. 3.

Figure 3:
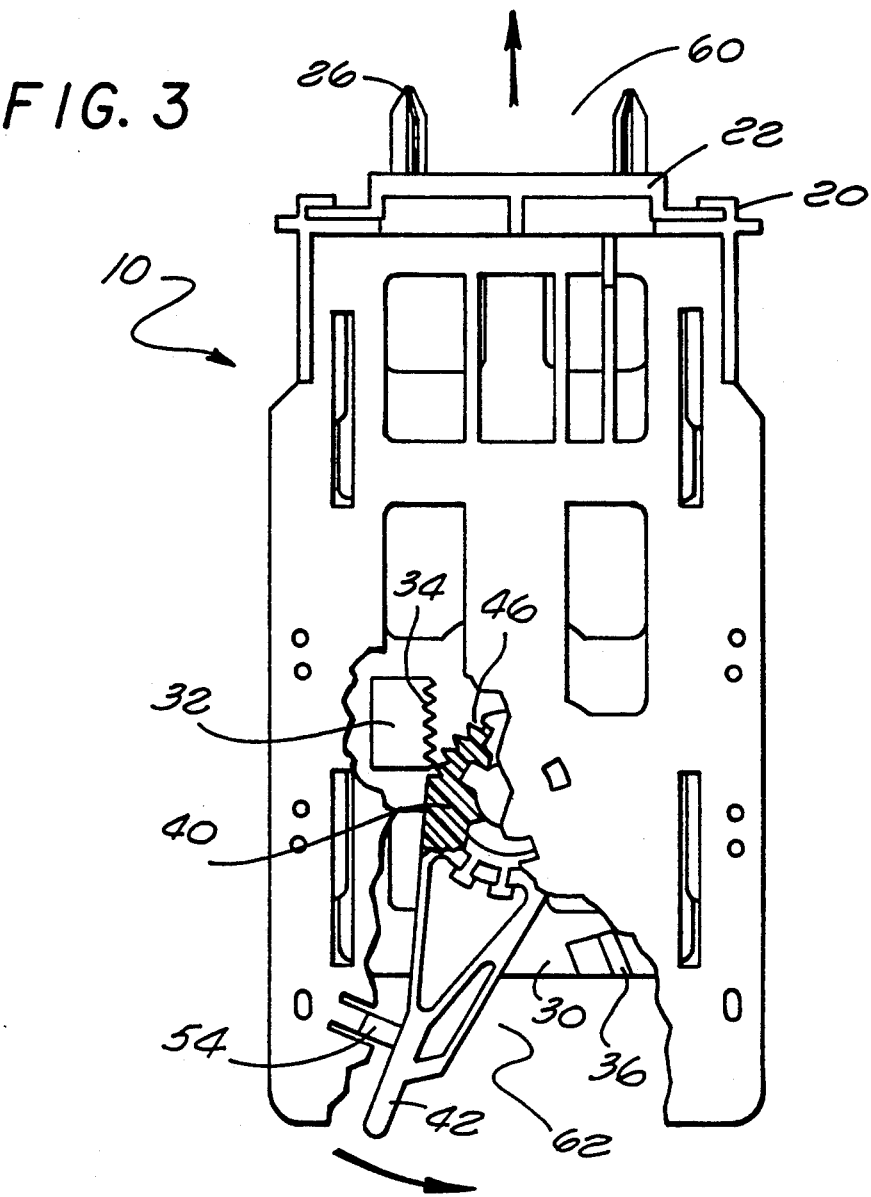
FIG. 3 is a top view of the present invention wherein motion of the lever in the direction shown advances the drive sled into the computer housing.
Figure 4:
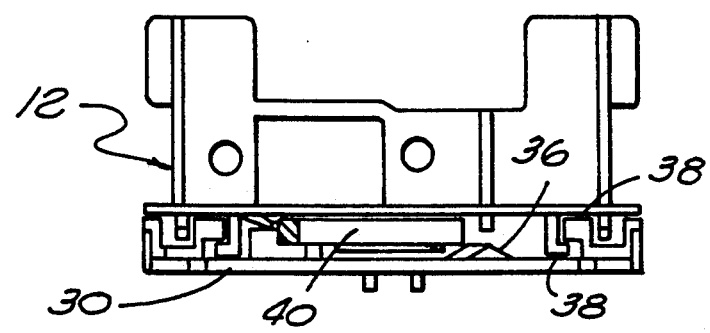
FIG. 4 is a view of the back end of the present invention in its fully assembled state.

FIG. 3 illustrates the motion of the drive sled 14 relative to the carrier tray 30 during insertion of the data storage drive into the computer housing. From the top view provided by FIG. 3, it can be seen that the teeth 46 of the pinion 40 have just begun to engage the teeth 34 of the rack 32. As the lever 42 continues with its counterclockwise rotation, according to the arrow, more and more teeth 46 of the pinion 40 engage the teeth 34 on the rack 34. In the mean time, the drive sled 14, to which the pinion 40 and lever 42 are attached, is pulled in the direction indicated by the arrow pointing upward at the top of FIG. 3. Since the carrier tray 30 is stationary, the only displacement caused by rotating the lever 42 is the linear advancement of the drive sled 14 into the computer housing. Of course, as the drive sled 14 advances so does the data storage drive which is attached piggyback to the drive sled 14. As is clearly shown here, the locating pins 26 disposed at the front end 60 of the assembly 10 are ideally situated to initiate the alignment process of the electrical connectors.

Still in FIG. 3, according to the preferred embodiment, the bias of the torsion spring 44 tends to rotate the lever 42 clockwise. Thus, a lever stop 54 is formed into the base 58 of the drive sled 14, against which the lever 42 can rest.

The present invention provides a means for latching the lever 42 after full insertion of the drive sled 14, when the lever 42 is in its right-most position. FIG. 4 illustrates this means, which is simply a raised wedge 36 formed into the top of the carrier tray 30 at its back end 62. The lever 42 is rotated counterclockwise until it encounters the wedge 36, which presents an obstacle in the lever's path of motion. Further pressure snaps the lever 42 over the pinnacle of the wedge 36. With the lever 42 in this position, the clockwise bias from the torsion spring 44 is insufficient to force the lever 42 back over the wedge 36. Consequently, the drive sled 14 is thus secured in its forward-most state for positive engagement with the computer port. In its unlatched state, on the other hand, there is ample room so that the lever 42 can sweep back and forth along its path freely without encountering the wedge 36 in order to manipulate the locating pins 26 into alignment.

Figure 5:
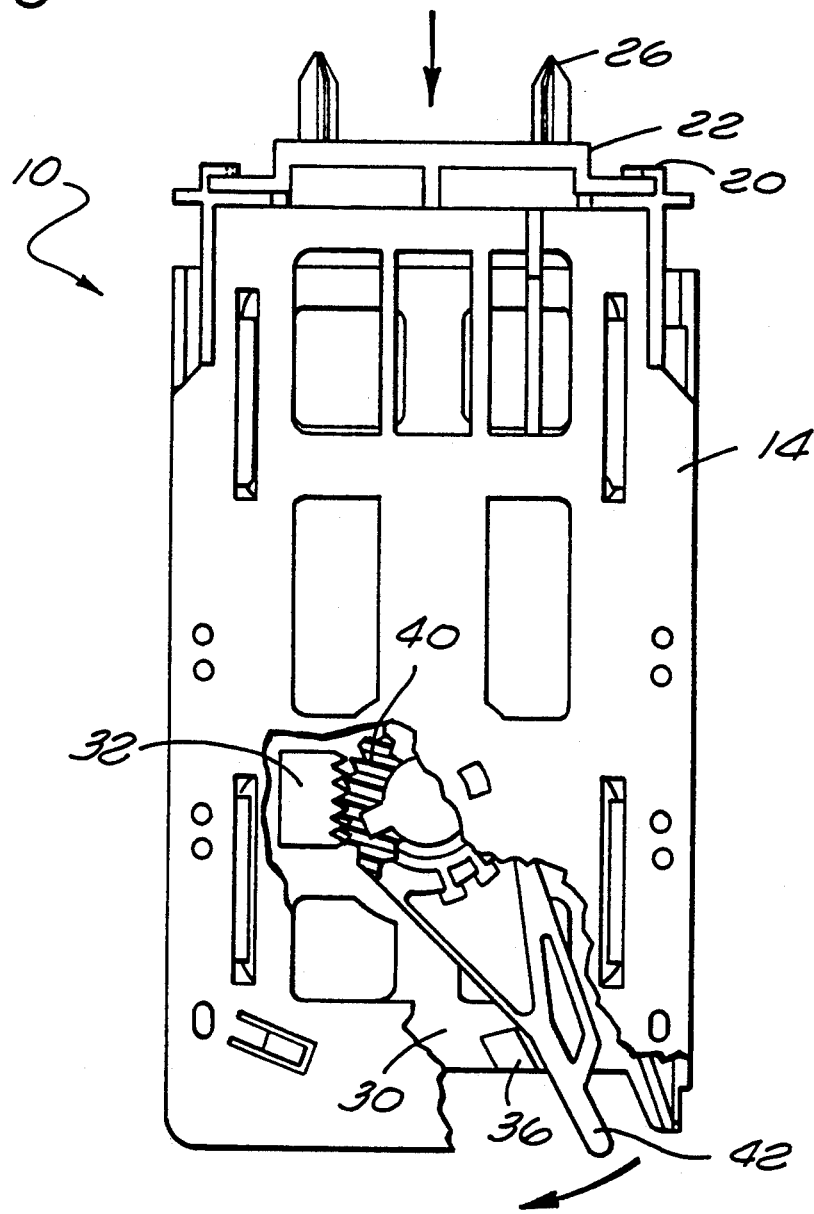
FIG. 5 is a top view of the present invention wherein the rotation of the lever in the direction shown causes the drive sled to retract from the computer housing.

FIG. 5 is a top view of the present invention and illustrates the motion of the drive sled 14 as it retracts from the computer housing. Notably, the drive sled 14 is in its forward-most position on the carrier tray 30. In this state, the lever 42 has already been moved counterclockwise to its extreme right position. Indeed, the lever 42 has been moved past the raised wedge 36 into its locked position.

As seen in FIG. 6, the two sides of the raised wedge 36 are sloped so that under slight finger pressure the lever 42 can be snapped over the wedge 36 to unlatch the lever 42. Without outside assistance, however, the slope in the wedge 36 is sufficient to maintain the lever 42 in its locked position against the bias of the torsion spring 44. Once the lever 42 is slid over the pinnacle of the wedge 36, spring force takes over to force the lever 42 to its extreme clockwise position, according to the arrow.

Action of the rack and pinion mechanism for retraction is the reverse of insertion. The lever 42 must be forced over the raised wedge 36 and moved in the clockwise direction as indicated by the arrow. Concurrently, the pinion 40 rotates clockwise and travels along the rack 32 in the direction indicated by the arrow shown at the top of FIG. 5. As the lever 42 reaches its left-most extreme position, the fully retracted state has been reached. This is where the process began as shown in FIG. 3. At this stage, the drive sled 14 can be slid out of engagement with the carrier tray 30 so that the data storage drive can be removed from the computer housing. Reinstalling the data storage drive into the housing simply entails repeating the above process.

In the preferred embodiment, all parts are made from a glass-filled polycarbonate material. Naturally, other materials known in the art can be used. Furthermore, the foregoing discussion illustrates only one preferred embodiment of the present invention. Many variations thereon are possible. Hence, the actual scope of the disclosure should be determined by reference to the appended claims.

What is claimed is:

1. A computer assembly comprising:
    a computer housing having receiving members;
    a removable computer component having electrical connectors and a means for transporting said removable computer component attached to said removable computer component;
    means for alignment disposed on the means for transporting including a floating guide adapted to carry said electrical connectors and having alignment pins, wherein said alignment pins are engageable with corresponding locating members provided in the computer housing while shifting said floating guide with said electrical connectors into engagement with receiving members in the computer housing;
    means for mounting said removable computer component, said mounting means fixed to said computer housing and having a rack formed thereon;
    a pinion having a radially projecting lever, disposed on the means for transporting, wherein the pinion engages the rack when the means for transporting is assembled to the means for mounting and the lever is moved to produce relative motion between the means for transporting and the means for mounting.

2. The computer assembly according to claim 1, wherein the removable computer component is a data storage drive.

3. The computer assembly according to claim 2, wherein the data storage drive is a hard disk drive.

4. The computer assembly according to claim 2, wherein the data storage drive is a floppy disk drive.

5. The computer assembly according to claim 2, wherein the data storage drive is a mass storage tape drive.

6. The computer assembly according to claim 2, wherein the data storage drive is an optical disk storage drive.

7. The computer assembly according to claim 1, wherein the pinion and lever are biased in a direction by a torsion spring having two ends, wherein one end is anchored to the means for transporting and the other end is anchored to the pinion.

8. The computer assembly according to claim 1, wherein the means for mounting has a raised wedge that selectively latches the lever against the bias of the spring.

9. The computer assembly according to claim 1, wherein the means for transporting provides first angled tracks for slideably engaging second angled tracks provided on the means for mounting.

10. The computer assembly according to claim 1, wherein each alignment pin has a tapered tip.

11. The computer assembly according to claim 1, wherein the floating guide comprises a flat plate having an aperture with said electrical connectors mounted therein, and wherein the flat plate is loosely restrained in channels disposed on the means for transporting with a predetermined clearance defined between the flat plate and the channels enabling a predetermined amount of vertical and lateral movement of the flat plate within the channels.

12. The computer assembly according to claim 1, wherein said means for transporting, means for alignment, said means for mounting, said rack and said pinion are made from a polycarbonate material with glass fillers.

13. The computer assembly according to claim 1, wherein each alignment pin has a substantially crisscross shape cross-section.

14. The computer assembly according to claim 1, wherein the locating members are positioning holes disposed on the computer housing.

15. A method of mounting a data storage drive having electrical connectors to a computer housing comprising the steps of:
   providing a means for transporting the data storage drive;
   attaching a means for alignment to the means for transporting, wherein the means for alignment includes a floating guide having alignment pins and an aperture adapted to receive the electrical connectors;
   attaching the means for transporting to the data storage drive and mounting the electrical connectors to the floating guide;
   providing a means for mounting the data storage drive to the computer housing, wherein the means for mounting has a rack formed thereon;
   attaching the means for mounting to the computer housing;
   assembling a pinion having a radially projecting lever to the means for transporting; and
   assembling the means for transporting to the means for mounting by engaging the pinion to the rack and moving the lever to rotate the pinion, thereby producing relative motion between the means for transporting and the means for mounting, and thereby inserting the alignment pins into locating members disposed in the computer housing, wherein the alignment pins shift the floating guide into aligning and engaging the electrical connectors with receiving members disposed in the computer housing.

16. A method of mounting a data storage drive according to claim 15, wherein the step of attaching the means for alignment to the means for transporting further comprises sliding the floating guide into channels disposed on the means for transporting leaving a predetermined clearance to enable a predetermined amount of motion of the floating guide in vertical and lateral directions.

17. A method of mounting a data storage drive according to claim 15, wherein the step of assembling a pinion having a radially projecting lever to the means for transporting further comprises providing a torsion spring between the pinion and the means for transporting to bias the pinion in a direction.

18. A method of mounting a data storage drive according to claim 15, wherein the step of providing a means for mounting further comprises forming a raised wedge on the means for mounting to selectively latch the lever against the bias of the spring.

19. A device for mounting a data storage drive having electrical connectors to a computer housing comprising:
   a drive sled attachable to the underside of the data storage drive wherein said drive sled defines a flat, rectangular plate with a vertical leading edge wall;
   a rectangular, floating guide plate having opposite edges that slide along channels disposed on the vertical leading edge wall, wherein the guide plate has an aperture therethrough adapted to receive the electrical connectors, and the guide plate has locating pins extending from either side of the aperture;
   a carrier tray having a channel shape, adapted to slideably receive the drive sled, and having a rack disposed thereon; and
   a pinion with a radially-extending lever assembled to an underside of the drive sled, biased in a direction by a torsion spring juxtaposed between the pinion and the drive sled, wherein the drive sled is assembled to the carrier tray by rotating the lever to advance the pinion along the rack which produces substantially linear displacement between the drive sled and the carrier tray and causes the locating pins to engage locating members disposed in the computer housing thus aligning and engaging the electrical connectors with receiving members disposed in the computer housing.

20. A device for mounting a removable computer component having electrical connectors to a computer housing having a rack and electrical connectors receiving members, comprising:
   means for transporting the removable computer component adapted to attachment to the removable computer component;
   means for alignment of said electrical connectors disposed on the means for transporting including a floating guide adapted to carry the electrical connectors and having alignment pins, wherein the alignment pins engage locating members provided in the computer housing while shifting the floating guide with the electrical connectors into engagement with the electrical connector receiving members in the computer housing;
   a pinion having a radially projecting lever, disposed on the means for transporting, wherein the pinion engages the rack when the means for transporting is assembled to the means for mounting and the lever is moved to produce relative motion between the means for transporting and the means for mounting.

21. A device for mounting a removable computer component according to claim 20, wherein said means for transporting which is adapted for attachment to said removable computer component is attachable to a data storage drive.

22. A device for mounting a removable computer component according to claim 20, wherein the pinion and lever are biased in a direction by a torsion spring having two ends, wherein one end is anchored to the means for transporting and the other end is anchored to the pinion.

23. A device for mounting a removable computer component according to claim 22, wherein the means for mounting has a raised wedge that selectively latches the lever against the bias of the spring.

24. A device for mounting a removable computer component according to claim 20, wherein the means for transporting provides first angled tracks for slideably engaging second angled tracks provided on the means for mounting.

25. A device for mounting a removable computer component according to claim 20, wherein each alignment pin has a tapered tip.

26. A device for mounting a removable computer component according to claim 21, wherein the data storage drive is a hard disk drive.

27. A device for mounting a removable computer component according to claim 21, wherein the data storage drive is a floppy disk drive.

28. A device for mounting a removable computer component according to claim 21, wherein the data storage drive is an optical disk storage drive.

29. A method of mounting a data storage drive having electrical connectors to a computer housing having mating electrical connectors and a drive receiving means including a rack, comprising the steps of:

providing a sled means for retaining and transporting the data storage drive, said sled means having a pinion having a radially projecting lever adapted to mate in use with the rack on said drive receiving means;

providing a means for alignment to the sled means, wherein the means for alignment includes a floating guide having alignment pins and an aperture adapted to receive the electrical connectors of the drive;

attaching the data storage drive to the sled means and mounting the electrical connectors to the floating guide;

assembling the sled means to the drive receiving means by engaging the pinion to the rack and moving the lever to rotate the pinion, thereby producing relative motion between the sled means and the drive receiving means, and thereby inserting the alignment pins into locating members disposed in the computer housing, wherein the alignment pins shift the floating guide into aligning and engaging the electrical connectors with receiving members disposed in the computer housing.

30. The method of mounting a data storage drive according to claim 29, wherein sled means further comprises a raised wedge and said lever is coupled to a spring means to bias said lever in a direction, the method comprising selectively latching the lever to the wedge against the bias of the spring.

31. A device for mounting a data storage drive having electrical connectors to a computer housing having mating electrical connectors and a carrier tray having a channel shape and having a rack disposed thereon, said device comprising:

a drive sled attachable to an underside of the data storage device, wherein said drive sled a flat, rectangular plate with a vertical leading edge wall, and said drive sled is adapted to be disposed within said channel;

a rectangular, floating guide plate having opposite edges that slide along channels disposed on the vertical leading edge wall, wherein the guide plate has an aperture therethrough adapted to receive the electrical connectors, and the guide plate has locating pins extending from either side of the aperture;

a pinion with a radially-extending lever assembled to an underside of the drive sled, biased in a direction by a torsion spring juxtaposed between the pinion and the drive sled, wherein the drive sled is assembled to the carrier tray by rotating the lever to advance the pinion along the rack which produces substantially linear displacement between the drive sled and the carrier tray and causes the locating pins to engage locating members disposed in the computer housing thus aligning and engaging the electrical connectors with receiving members disposed in the computer housing.

* * * * *